Oct. 13, 1925.
P. K. VAN DER STERR
1,557,110
ARRANGEMENT FOR THE PROTECTION OF SUBSTATIONS
Filed Aug. 29, 1921
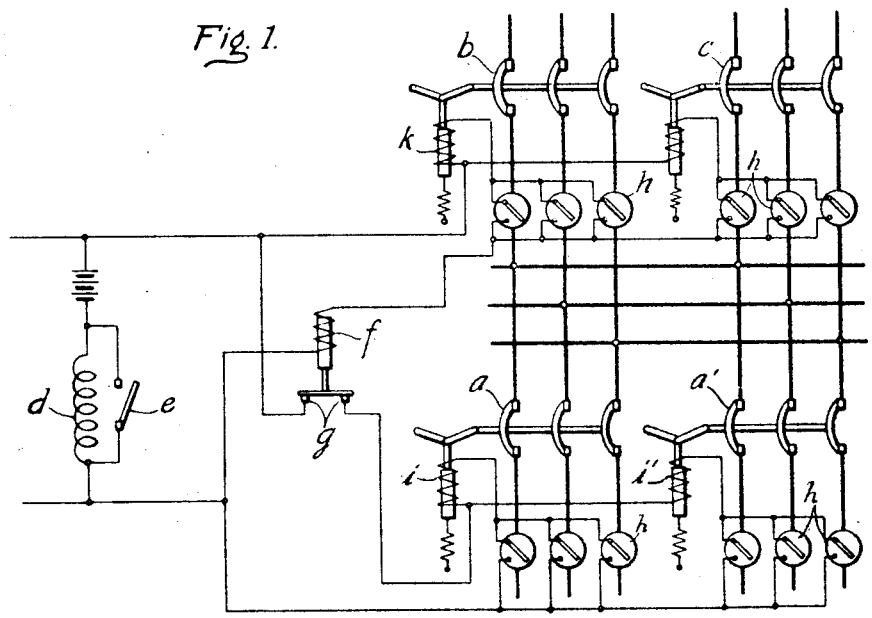
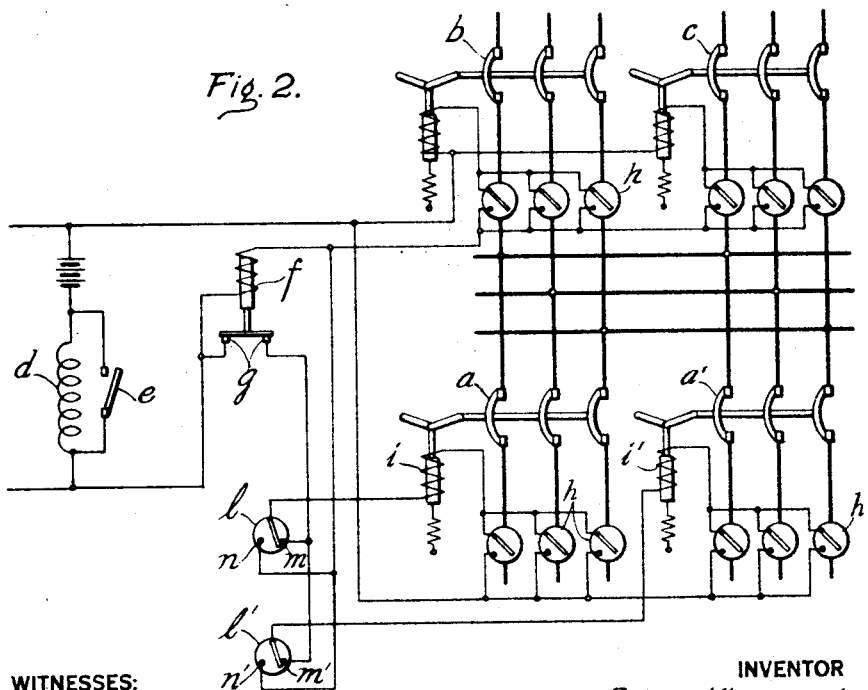
WITNESSES:
INVENTOR
Petrus Klaas van der Sterr
BY
ATTORNEY

Patented Oct. 13, 1925.

1,557,110

UNITED STATES PATENT OFFICE.

PETRUS KLAAS VAN DER STERR, OF FRANKFORT-ON-THE-MAIN, GERMANY, ASSIGNOR, BY MESNE ASSIGNMENTS, TO WESTINGHOUSE ELECTRIC & MANUFACTURING COMPANY, A CORPORATION OF PENNSYLVANIA

ARRANGEMENT FOR THE PROTECTION OF SUBSTATIONS.

Application filed August 29, 1921. Serial No. 496,672.

(GRANTED UNDER THE PROVISIONS OF THE ACT OF MARCH 3, 1921, 41 STAT. L., 1313.)

*To all whom it may concern:*

Be it known that I, PETRUS KLAAS VAN DER STERR, a subject of the Queen of the Netherlands, and residing at Frankfort-on-the-Main, Hanauerlandstrasse, Germany, have invented certain new and useful Improvements in Arrangements for the Protection of Substations (for which I have filed an application in Germany, Jan. 26 and March 5, 1920), of which the following is a specification.

My invention relates to protective apparatus for electrical systems and particularly to an improved arrangement of such apparatus for a system having a number of circuit-interrupters controlled by a common voltage-drop or reverse-energy relay.

The object of my invention is to insure that a substation shall not be entirely disconnected from a system upon the occurrence of a fault adjacent the station.

In a system comprising a plurality of substations connected together, a common voltage-drop or reverse-energy relay in each substation may be employed to control the tripping of all or of a number of the circuit-interrupters in said substation. Upon the occurrence of a heavy short-circuit in the outgoing lines of a substation, however, the circuit-interrupters in both the incoming and outgoing lines will be tripped, thereby entirely disconnecting the substation.

In order to prevent the disconnection of the substation, I propose to insert a relay in the control circuit of the circuit interrupters on the outgoing lines, the contacts of the relay being arranged to open the control circuit of the circuit-interrupters on the incoming lines. When the circuit-interrupters on the outgoing lines are tripped, the circuit-interrupters on the incoming lines can not be tripped to disconnect the substation from the system.

The invention may be clearly understood upon reference to the accompanying drawings, in which Fig. 1 is a diagrammatic view of a system embodying the invention; and Fig. 2 is a similar view of a modification thereof.

Referring to Fig. 1, $a$ and $a'$ are circuit-interrupters in the incoming lines of a substation and $b$ and $c$ are circuit-interrupters in the outgoing lines from the same substation. A common voltage-drop relay $d$ is provided that closes its contacts $e$ when it is operated, after a time interval that depends upon the potential or voltage-drop in the system. The voltage-drop relay $d$ controls a relay $f$ having normally closed contacts $g$, the operation of the relay $d$ being initiated by overcurrent relays $h$ connected in the incoming and outgoing lines. The contacts $g$ of the relay $f$ are in series with the trip coils $i$ and $i'$ of the circuit-interrupters $a$ and $a'$ in the incoming lines. The operating winding of the relay $f$ is connected in series with the trip coils $k$ of the circuit-interrupters $b$ and $c$ in the outgoing lines.

The operation of the system is as follows:

If a short-circuit occurs on an outgoing line that causes a heavy current to flow through the circuit-interrupter $b$, the overcurrent relays $h$ associated with said circuit-interrupter and with the circuit-interrupters $a$ and $a'$ are energized and initiate the operation of the voltage-drop relay $d$, the circuit being from battery through the trip coils $k$, $i$ and $i'$, the overcurrent relays $h$, and the winding of relay $d$.

After a time interval that depends upon the voltage-drop in the system at the substation, the relay $d$ closes the contacts $e$. The contacts $e$ short-circuit the high-resistance winding $d$ and energizes the relay $f$ and the trip coils $k$, $i$ and $i'$. The relay $f$ operates and opens the tripping circuits of the circuit-interrupters $a$ and $a'$ in the incoming lines before these interrupters are opened. The circuit-interrupter $b$ is tripped to disconnect the faulty line. The outgoing line connected to the circuit-interrupter $c$ is supplied with current through the incoming lines connected to the circuit-interrupters $a$ and $a'$, and the substation continues in operation.

Instead of the voltage-drop relay $d$, a common reverse-energy relay could be used without departing from the spirit of the invention.

When several substations are connected in a ring system, and the arrangement shown in Fig. 1 is used in a substation having a plurality of incoming lines, a short-circuit in one of the incoming lines will disconnect all of the incoming lines and interrupt the ring. The arrangement shown in Fig. 2 overcomes this difficulty.

The system shown in Fig. 2 is similar to that shown in Fig. 1, except that reverse-energy relays $l$ and $l'$ are provided for the incoming lines terminating in the circuit-interrupters $a$ and $a'$. For the normal direction of the flow of energy in the system, the relays $l$ and $l'$ close circuits through the contacts $m$ and $m'$. Upon a reversal of the flow of energy, the relays close circuits through the contacts $n$ and $n'$, respectively.

When a short-circuit occurs in the incoming line terminating in the circuit-interrupter $a$, power flows through the circuit-interrupter $a'$ to the busbars at the sub-station and in the reverse direction through the circuit-interrupter $a$. The overcurrent relays $h$ in both incoming lines operate and the relay $l$ is actuated to close a circuit through the contact $n$. The voltage-drop relay $d$ operates as described above and closes a circuit through relay $f$ and the contact $n$ of relay $l$ to energize the relay $f$. The circuit-interrupter $a$ is tripped to disconnect the faulty line but the circuit-interrupter $a'$ remains closed since its tripping circuit is open at the contacts $g$. The substation is therefore maintained in service and the ring is not interrupted.

I claim as my invention:—

1. An electrical system comprising a substation, incoming and outgoing lines terminating thereat, circuit-interrupters in said lines, a common relay for controlling said circuit-interrupters, means for actuating said relay upon the occurrence of a short-circuit in either the incoming or the outgoing lines, and a second relay for preventing the operation of certain of said circuit-interrupters when other of said circuit-interrupters are operated.

2. An electrical system comprising a substation, incoming and outgoing lines terminating thereat, circuit-interrupters in said lines, a common relay controlling said circuit-interrupters, means for operating said relay to close the tripping circuits of all of said circuit-interrupters upon the occurrence of a short-circuit in any of said lines, and means for preventing the circuit-interrupters in the incoming lines from operating if the short-circuit is in one of the outgoing lines.

3. An electrical system comprising a plurality of circuit-interrupters, means including a common voltage-drop relay for controlling the same in case of a fault, and means depending upon the location of the fault for rendering said relay ineffective to control certain of said circuit-interrupters.

4. An electrical system comprising a substation having a plurality of incoming lines and an outgoing line, circuit-interrupters in said lines, a common relay for controlling said circuit-interrupters, means for operating said relay upon the occurrence of a fault in any of said lines, and means including a reverse-energy relay associated with each of said incoming lines to select the faulty one of said lines.

In testimony whereof I affix my signature.

PETRUS KLAAS van der STERR.